H. S. VOTAW & H. G. COULSON.
STATION INDICATOR.
APPLICATION FILED JAN. 9, 1911.

1,058,817.

Patented Apr. 15, 1913.

3 SHEETS—SHEET 1.

WITNESSES:

INVENTORS:
H. S. Votaw,
H. G. Coulson,
BY
ATTORNEY.

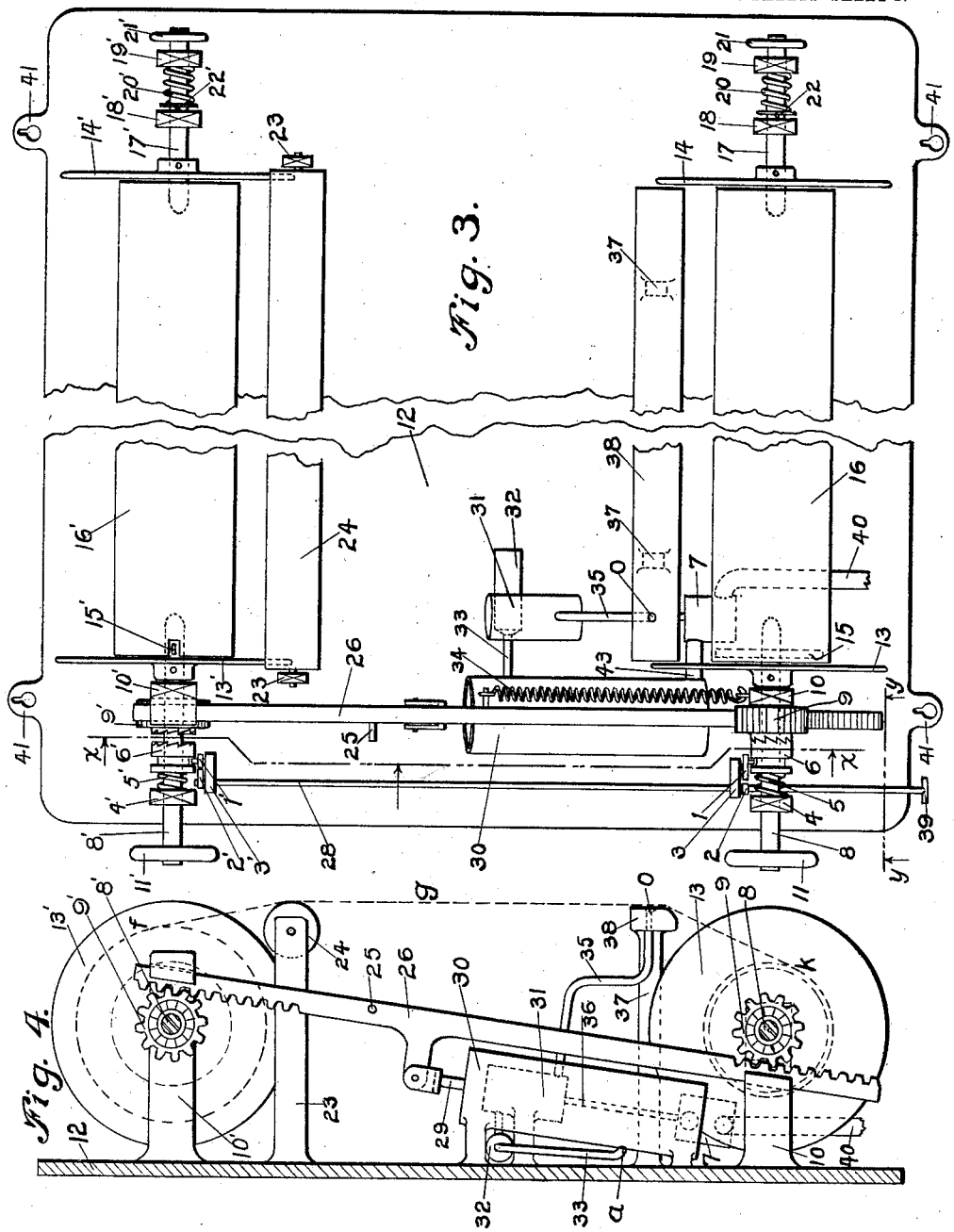

H. S. VOTAW & H. G. COULSON.
STATION INDICATOR.
APPLICATION FILED JAN. 9, 1911.
1,058,817.
Patented Apr. 15, 1913.
3 SHEETS—SHEET 3.
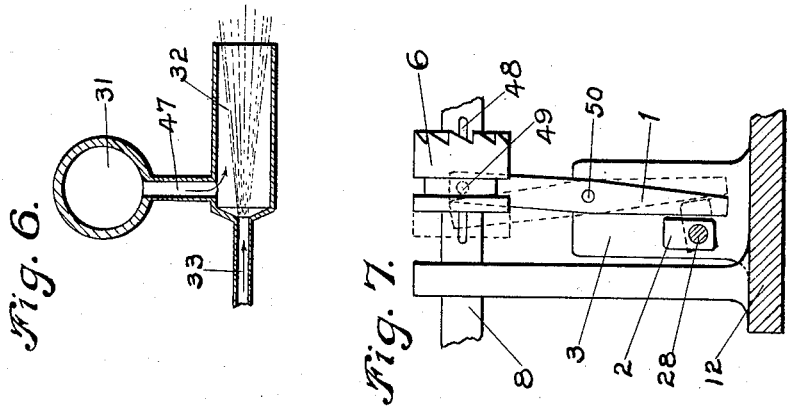
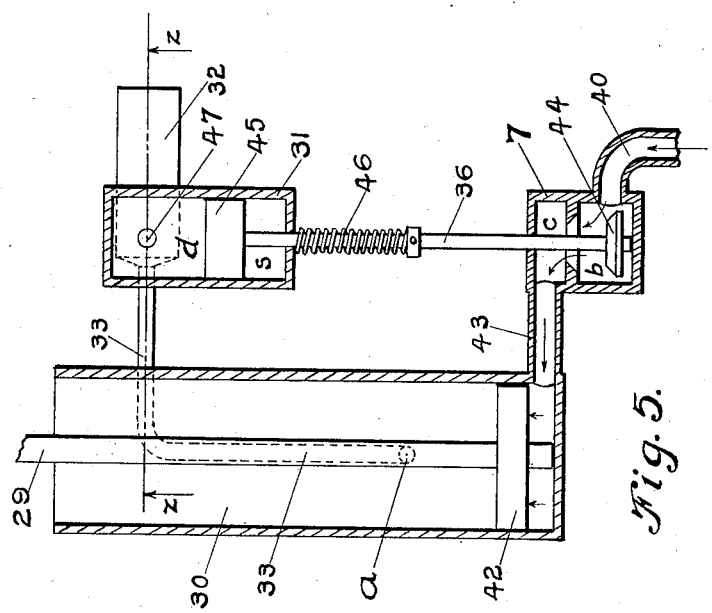
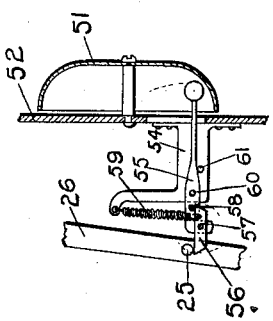
WITNESSES:
R. E. Randle
R. L. Hearn
INVENTORS:
H. S. Votaw
and H. G. Coulson
BY Robert W. Randle
ATTORNEY.

UNITED STATES PATENT OFFICE.

HOMER S. VOTAW, OF LAURIER, WASHINGTON, AND HARRY GLENN COULSON, OF PORTLAND, INDIANA.

STATION-INDICATOR.

1,058,817. Specification of Letters Patent. Patented Apr. 15, 1913.

Application filed January 9, 1911. Serial No. 601,556.

*To all whom it may concern:*

Be it known that we, HOMER S. VOTAW, of Laurier, in the county of Ferry and State of Washington, and HARRY GLENN COUL-SON, of Portland, in the county of Jay and State of Indiana, both citizens of the United States, have invented certain new and useful Improvements in Station-Indicators, of which the following is a full, clear, and accurate specification.

The device herein set forth is intended as an indicator to be placed inside of a railway car, or other vehicle, to indicate the various stations as they are being approached by the vehicle.

The object of the invention is to provide a station indicator to be located inside of cars or other vehicles to indicate the various stations progressively as they are being approached, to provide means for calling the attention of passengers thereto, and to provide for the display of advertisements in connection therewith.

More particularly stated the object is to provide a station indicator which will be pneumatical in operation, will be easily operated and controlled, and which can be manufactured at a comparatively low price.

Other objects and particular advantages of the invention will be brought out in the course of the following specification, and that which is new will be correlated in the appended claims.

One manner for carrying out our invention in a practical manner and that which we have determined to be the most simple and efficient is shown in the accompanying drawings, in which—

Figure 1:
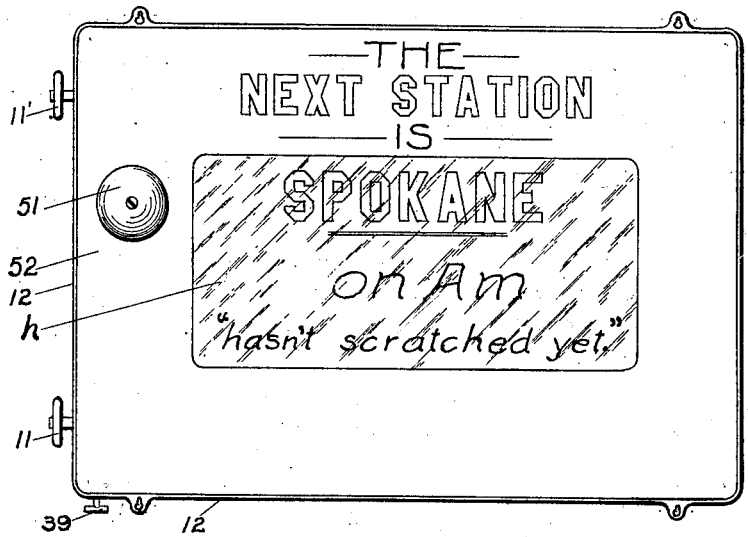
Figure 2:
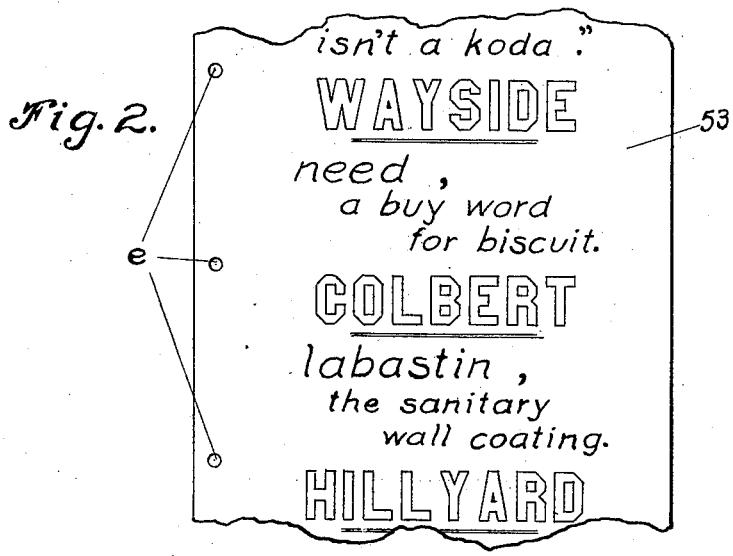

Figure 1 shows a front elevation of our invention complete as it would appear in actual practice in a car or other vehicle. Fig. 2 shows the face of a portion of the ribbon on which the names of the stations or streets are printed, and on which advertisements may be printed. Fig. 3 shows a front elevation of the interior mechanism with the front of the case and the ribbon removed, the central portion being shown as broken away. Fig. 4 shows an end elevation of the mechanism, certain parts being in section taken on line $x$—$x$ of Fig. 3. Fig. 5 is a sectional elevation taken through the stop devices which are shown in elevation in Figs. 3 and 4. Fig. 6 shows a detail section of certain parts of the stop devices, as taken on line $z$—$z$ of Fig. 5. Fig. 7 is a detail showing a front elevation of the reversing mechanism. And Fig. 8 is a detail view showing the gong tapping mechanism.

Similar indices denote like parts throughout the several views.

The several devices, which will be referred to in their order, are carried upon the frame or back 12. Secured to and projecting outward from said back are the several hangers or bearing members 3, 3', 4, 4', 10, 10', 18, 18', 19, 19', 23, 23, 37—37, and also suitable brackets for the cylinders 30 and 31, and the valve-box 7. Mounted in the bearings 4 and 10 is the shaft 8, and mounted in the bearings 4' and 10' is the shaft 8'. Secured on shaft 8 is the flange 13, and secured on shaft 8' is the flange 13'. Revolubly mounted on shafts 8 and 8' are the respective spur pinions 9 and 9', each of which has a ratchet clutch formed on its left-hand end as indicated. Clutch collars 6 and 6' are slidably splined on the respective shafts 8 and 8', substantially as indicated by spline 48 in Fig. 7, and they are adapted to engage with the clutch of pinions 9 and 9' as shown at the lower portion of Fig. 3. Springs 5 and 5' tend to normally hold the respective clutches in engagement with each other.

Mounted in bearings 18 and 19 is the shaft 17, and mounted in bearings 18' and 19' is the shaft 17'. Flanges 14 and 14' are secured upon the respective shafts 17 and 17'. Secured on the outer ends of shafts 17 and 17' are the respective thumb buttons 21 and 21'. Rollers 16 and 16' are mounted between the respective pairs of flanges 13—14 and 13'—14', carried on the respective pairs of shafts 8—17 and 8'—17'. Springs 20 and 20', pressing on the respective pins 22 and 22', which latter are disposed through the respective shafts 17 and 17', serve to hold the said rollers in position on the respective projecting ends of the shafts 8—17 and 8'—17'. The flanges 14 and 14' are resiliently pressed against the right-hand ends of the respective rollers 16 and 16' by means of the respective springs 20 and 20'.

Rollers 16 and 16' are caused to revolve with shafts 8 and 8' by means of the cross pins 15 and 15', which fit in slots therefor across the ends of the respective rollers, as indicated in Fig. 3.

Slidably mounted in suitable guides formed on posts 10 and 10′ is a rack-bar 26, which is disposed at an angle and which is in engagement with the respective pinions 9 and 9′, passing in the rear of the former and in front of the latter, and it is adapted to revolve said pinions when the bar is moved endwise, turning said pinions opposite to each other. Said bar 26 is adapted to be moved upwardly by piston-rod 29 to which it is connected, and is adapted to be returned to normal position by the action of spring 34.

Roller 24 is mounted in bearings 23—23, and it is located parallel with rollers 16 and 16′, and is positioned a little forward of the center thereof, as shown in Fig. 4. Bar 38 is mounted on the outer ends of posts 37—37, and is located parallel with roller 24 and directly therebelow, being only a short distance from roller 16. Said bar 38 has a hole $o$ formed therein near the left-hand end thereof.

Numeral 30 denotes the main cylinder; numeral 31 the smaller cylinder; and numeral 7 denotes the valve-box; all of which are carried by suitable brackets or hangers extending out from the back 12.

Pipe 40 leads from a source of compressed air which may be turned on and off, either at the indicator or at the source of supply. Said pipe 40 leads into chamber $b$ (Fig. 5) of the valve-box 7. Pipe 43 connects chamber $c$ (being the upper portion of valve-box 7) with the lower end of cylinder 30. Pipe 33 connects port $a$ of cylinder 30 with the enlarged escape tube 32 (Fig. 6). Pipe 47 connects the interior of tube 32 (being located near the closed end of the latter) with the chamber $d$ of the cylinder 31, as indicated in Figs. 5 and 6. Piston 45 works up and down in cylinder 31 and it is connected to valve 44 by piston-rod 36. Spring 46 tends to normally hold valve 44 open, there being a partition in valve-box 7 having a valve-seat adapted to be closed by said valve 44. Pipe 35 leads from the hole $o$ through bar 38 to chamber $s$ located in the lower portion of cylinder 31. When rack-bar 26 moves upward, roller 16, or 16′, is rotated according to which clutch collar 6 or 6′ is in engagement. By reversing the device either of the collars 6 or 6′ may be held out of engagement while the other is permitted to engage by action of spring 5′ or 5. The reverse is accomplished by the handle 39 on end of rod 28, which is mounted in the upwardly projecting members 3 and 3′.

As is shown in Fig. 7, lever 1 is pivoted on pin 50 projecting from member 3. Lever 1 carries at its upper end the pin 49 which engages the groove of collar 6. When rod 28 is turned cam 2 engages lever 1 and the parts move to the position shown by the dotted lines. This position is retained by reason of the flat face of cam 2. Cams 2 and 2′ are placed at an angle of 90 degrees on rod 28, so that one clutch may be held out while the other is in engagement.

Ribbon 53 is to be wound back and forth upon rollers 16 and 16′, and to pass over in front and in contact with roller 24 and the bar 38, as indicated by dotted lines $f$, $g$, and $h$, in Fig. 4. The holes $e$ in the ribbon are in line with the hole $o$ in the bar 38.

It will be noticed that the hole $o$ is covered and closed by the ribbon 53 except when the holes $e$ come to that point. The ribbon 53 is rolled from rollers 16 to roller 16′ or vice-versa until such length is wound up as to expose in succession the desired number of stations or street names, when its motion is reversed by turning handle 39, and the station or street name then appears in the reverse order. By reason of the location of the holes $e$, and the stopping device, the motion of the ribbon is stopped just as a name and an advertisement comes into full view, an action which is made necessary by reason of the varying length of stroke of rack bar 26. This varying length of stroke is made necessary on account of the changing diameter of the ribbon upon spools 16 and 16′, as the ribbon is rolled and unrolled. Now when air is turned into the pipe 40, it passes through chambers $b$ and $c$ and pipe 43 and into cylinder 30 where it pushes piston 42 and piston rod 29 upward. Rack-bar 26 being connected with piston-rod 29 also moves upward, rotating pinions 9 and 9′ and shafts 8 or 8′ (according to which clutch is engaged) with roller 16, or 16′, and the ribbon wound thereon. As the piston 42 continues to move upward, it passes the port $a$, but not until the ribbon has moved along sufficiently to close the hole $o$, with which a hole $e$ registered at the beginning of the motion. Piston 42 having passed port $a$, continues to move upward, but now a small portion of the air passes into pipe 33 (pipe 33 being smaller than pipe 43) and escapes into the open from tube 32, as shown in Fig. 6. This escaping of air from tube 32 produces a suction or vacuum in pipe 47, upon the principle of lateral diminution of pressure, and hence produces a vacuum or suction in chamber $d$ of the cylinder 31, with which pipe 47 is connected. The suction in chamber $d$ produces an upward pull on piston 45, but the latter cannot move because chamber $s$ below it is closed to the entrance of outside air. Motion of the ribbon continues until a hole $e$ in the ribbon registers with hole $o$, when air will enter through hole $o$ with a rush, passing through pipe 35 into chamber $s$, which, manifestly will permit piston 45 to move quickly upward, carrying with it the rod 36, and therefore closing valve 44, thereby cutting off the flow of compressed air through pipe 40. Valve 44 will remain closed by reason of the pressure in pipe 40 pressing thereagainst, until the air is turned off from pipe 40, after which piston 45, rod 36, and valve 44 will move down, that is back to normal position, by the action of spring 46. Piston 42, rod 29, and rack bar 26 will now move back under action of spring 34 to normal position. In this return movement the shafts 8 and 8' are not rotated because the clutch which is in engagement slips its teeth as a ratchet.

When it is desired to change the ribbon for one with different stations or streets than those shown, the front of the case may be opened, the ribbon is then all wound on one roller (16 for instance) by turning the hand-wheel 11, then by pulling on thumb button 21, against the action of spring 20, the shaft 17 may be pulled out of the hole in the end of the roller 16 and away from the roller 16 far enough so that the roller can be lifted outward at that end and taken off of shaft 8 at the other end. The roller carrying the new ribbon is next placed with its slotted end on the end of shaft 8, then swing it into line with shaft 17 which is allowed to spring into place at the right hand end. The end of the ribbon is next carried over bar 38 and roller 24, and started around roller 16' by turning wheel 11'. Band wheels 11 and 11' are intended, more particularly, for use when it is desired for any reason to operate the ribbon manually.

Referring now particularly to Fig. 8 we will describe the tapping mechanism, or gong: The gong 51 is attached to the front of the case 52. Bracket 54 extends back from the inner face of the front 52. Said bracket 54 carries the fulcrum pin 60 and the stop pin 61. The tapper arm 55 is pivoted on pin 60 and it carries the fulcrum pin 57 and stop pin 58. Trip member 56 is pivoted on pin 57. The helical spring 59 has one end attached to member 56, between pins 57 and 58, and the other end is attached to projection of bracket 54. The action is as follows: In the downward or return movement of the rack-bar 26, pin 25 engages the upper edge of member 56, causing the tapper-arm 55 and member 56 to rotate (just as if they were one solid piece) about pin 60, member 56 moving downward and the tapper end moving upward away from the gong. When rotated through a few degrees of the arc pin 25 will slide past the end of member 56, and then the spring 59 instantly bring back members 56 and 55 to the position shown, the tapper 55 striking against stop pin 61. The right-hand end of arm 55 being small in size, springs a little farther, allowing the tapper to strike the gong a smart rap. In the upward movement of the rack-bar 36, pin 25 engages the lower edge of member 56, and since member 56 and arm 55 can not rotate as a whole about pin 60 on account of the stop pin 61, member 56, only, rotates about pin 57 as an axis until pin 25 moves past its end, when it is brought back to normal position, against stop-pin 58, by the action of spring 59. The sound of the gong serves to call the attention of the passengers to the changed station or street name, and also to the advertisements displayed.

Having now fully shown and described our invention as fully and as completely as we are able to do at this time, what we claim and desire to secure by Letters Patent of the United States, is—

1. In an indicator of the class described, a ribbon, spaced drums on which said ribbon is oppositely wound, means for oppositely and independently rotating the drums, said means including a cylinder, a fluid operated piston contained in said cylinder and operatively connected to the drums, an exhaust tube for the cylinder having an enlarged end, a valved connection controlling the supply of fluid to the cylinder, an inclosed piston connected with the valve, a port connecting said inclosure and enlarged end of the exhaust tube whereby the exhaust will cause a suction in the piston inclosure last mentioned tending to close the supply valve and means for admitting fluid behind the last mentioned piston to shift the same and close the valve carried thereby.

2. In a station indicator, a ribbon having alined openings therein and containing the names of the stations to be disposed to view successively, means for driving the ribbon and including a fluid operated bar, means for controlling the supply of fluid to operate the bar, means for relieving the bar of the pressure of the fluid when the bar has moved a predetermined distance and means conjunctively operated by the last mentioned means and the openings in the ribbon by fluid entering through the latter, to bring the ribbon to a stop.

3. A station indicator comprising a web having an alined row of openings therethrough, means for driving the web and including a piston-operated bar, a valve controlling the supply of air to the piston for moving the web, a duct leading from the cylinder of the piston to exhaust the air therefrom in front of the piston when the piston has moved a predetermined distance, said duct having an enlarged outlet, a second valve connected with the first named valve, means associated therewith to hold the first valve open, a casing for the second valve having communication with the outlet whereby a laxity of air is created by said exhaust tending to move said valves simultaneously and a conduit communicating with said casing behind the valve therein to aline with the openings in the web for supplying air to the casing to overcome the means for holding the first valve open whereby the exhaust will shift the valves to close the first and cut off the air supply.

4. In a station indicator, a ribbon having alined openings therethrough and containing the names of stations and advertising matter, a casing having a view opening before which said names and matter are arranged, rollers on which said ribbon is wound, means for manually rotating the rollers, means for changing the direction of rotation of the rollers, pinions carried by the rollers, a rack bar having oppositely disposed teeth engaging the pinions, a cylinder having an air supply, a piston in the cylinder and connected to the bar for moving the same in one direction, means for oppositely moving the bar, a second cylinder, an air conduit to exhaust air from the first cylinder, said conduit having communication with the second cylinder and being provided with means whereby the exhaust will create a laxity of air therein, a piston in the second cylinder, an apertured bar over which the ribbon passes whereby the openings will register, a valve controlling the air supply and connected to the second piston, a spring operating to hold said valve open and a conduit connecting the bar aperture to the second cylinder to supply air behind the second piston to close the valve upon registration of said openings.

In testimony we have hereunto subscribed our names to this specification in the presence of two subscribing witnesses.

HOMER S. VOTAW.
HARRY GLENN COULSON.

Witnesses as to the signature of Homer S. Votaw:
ALEX. A. ANDERSON,
CHAS. E. PRICE.

Witnesses as to the signature of Harry Glenn Coulson:
G. W. PEDDYCORD,
W. O. HOELAND.

---

Copies of this patent may be obtained for five cents each, by addressing the "Commissioner of Patents, Washington, D. C."